United States Patent
Hwang

(10) Patent No.: US 12,483,678 B2
(45) Date of Patent: Nov. 25, 2025

(54) APPARATUS AND METHOD FOR FILMING VIDEO USING PROJECTOR

(71) Applicant: VISIONONCHIP CO., LTD., Seoul (KR)

(72) Inventor: Doo Young Hwang, Bucheon-si (KR)

(73) Assignees: VISIONONCHIP CO., LTD., Seoul (KR); TBDEX CO., LTD., Seoul (KR)

( * ) Notice: Subject to any disclaimer, the term of this patent is extended or adjusted under 35 U.S.C. 154(b) by 267 days.

(21) Appl. No.: 18/563,245

(22) PCT Filed: Feb. 18, 2022

(86) PCT No.: PCT/KR2022/002430
§ 371 (c)(1),
(2) Date: Nov. 21, 2023

(87) PCT Pub. No.: WO2022/203212
PCT Pub. Date: Sep. 29, 2022

(65) Prior Publication Data
US 2025/0324022 A1    Oct. 16, 2025

(30) Foreign Application Priority Data
Mar. 24, 2021 (KR) .................. 10-2021-0038122

(51) Int. Cl.
*H04N 9/31* (2006.01)
*G03B 17/54* (2021.01)
*H04N 23/73* (2023.01)

(52) U.S. Cl.
CPC ........... *H04N 9/3179* (2013.01); *G03B 17/54* (2013.01); *H04N 23/73* (2023.01)

(58) Field of Classification Search
CPC ...... H04N 9/31; H04N 9/3176; H04N 9/3179; H04N 23/64; H04N 23/73; G03B 17/54
USPC ............. 348/739, 744; 353/28, 30, 121, 122
See application file for complete search history.

(56) References Cited

U.S. PATENT DOCUMENTS

2021/0409665 A1*  12/2021  Faragher .............. H04N 9/3182

FOREIGN PATENT DOCUMENTS

| JP | 2014-032159 A | 2/2014 |
| JP | 2015-106050 A | 6/2015 |
| JP | 2016-092779 A | 5/2016 |
| JP | 2017-015872 A | 1/2017 |
| KR | 10-1909897 B1 | 10/2018 |

\* cited by examiner

*Primary Examiner* — Sherrie Hsia
(74) *Attorney, Agent, or Firm* — Lucem, PC; Heedong Chae

(57) ABSTRACT

The present invention relates to a device for filming a video using a projector, which comprises: a projector that receives an image for a projection from an external device or internal memory and projects the image onto a screen board; a camera for creating the video by filming the screen board on which the image is projected; a controller that controls a projection frame cycle of the projector and an exposure cycle of the camera. The controller controls a time schedule for the projection frame cycle of the projector for filming the video. The time schedule includes a projection time period when the projection is cast, and a non-projection time period when no projection occurs. The non-projection time period is controlled within the range of 40% to 60% of the projection frame cycle.

10 Claims, 8 Drawing Sheets

APPARATUS AND METHOD FOR FILMING VIDEO USING PROJECTOR

TECHNICAL FIELD

The present invention relates to a device and method for filming a video using a projector.

BACKGROUND ART

With the increasing use of the Internet, video materials are widely used for education, promotion, and advertising activities.

Typically, these materials are mainly used by customers viewing pre-recorded videos on websites, and occasionally they are delivered through real-time streaming. Basic lectures are usually recorded in advance, while Q&A sessions are often conducted through streaming.

In this case, in order to increase the video effect and improve the convenience of explanation, a method of projecting a pre-recorded content on a blackboard or desk and filming a video explaining it is sometimes used.

Various studies are being conducted on this, but among them, the projection method involves projecting digital information directly onto a real object using a projector light. This method allows for the effect of various multimedia contents being displayed and functioning on the real object.

This projection method has the advantage of allowing users to experience realistic additional information while viewing the real object.

On the other hand, to enhance comprehension in learning, it may be more effective for a teacher or presenter to directly draw and explain the projected content on the screen, similar to lecturing with a chalkboard.

In this case, the content being projected can be simultaneously recorded in the video, potentially diminishing the effectiveness of the presenter's intended lecture.

As a solution to this problem, after recording with a projector, methods such as using a chroma key technique or a background removal correction technique were employed to remove the projected content from the video. However, these methods are inefficient because they require the additional time for processing.

Therefore, while teachers or video producers create videos using projector projections to display digital information as is, a method is needed to prevent the projector's output from being captured in real-time in the final video.

The background technology for the present invention has been disclosed in Republic of Korea Patent No. 10-0987645 (video providing device for providing video lectures on a personal panel using a projector).

SUMMARY OF THE INVENTION

Technical Problem

The present invention provides a device and method for recording a video where a video producer uses a projector to project digital information, while ensuring that the output of the projected image is restricted in the actual recorded video.

The objectives of the present invention are not limited to those mentioned above, and other objectives not mentioned can be clearly understood from the following disclosure.

Solution to Problems

According to one aspect of the present invention, a device for recording a video using a projector includes a projector that receives an image to be projected from an external device or internal memory and projects the image onto a screen board; a camera for recording the video by filming the screen board, and a controller that controls a projection frame cycle of the projector and a exposure frame cycle of the camera. The controller controls a time schedule for the projection frame cycle of the projector for recording the video to include a projection time period when the projection is cast and a non-projection time period where the projection is not cast, wherein the non-projection time period follows the projection time period in each projection frame cycle. The non-projection time period is controlled within the range of 40% to 60% of the projection frame cycle. The exposure frame cycle of the camera is controlled such that an exposure frame time is set within and is shorter than the non-projection time of the projector.

Additionally, the controller includes an input unit that allows users to selectively input time schedule conditions for the projection frame cycle of the projector and the exposure frame cycle of the camera for production of the video.

Furthermore, the controller is configured to set the projection frame cycle of the projector to have a consistent period within the range of 20 to 50 milliseconds.

The controller is configured to set the projection frame cycle of the projector in the range of 30 to 35 milliseconds and the non-projection time period in the range of 15 to 18 milliseconds.

The exposure frame time of the camera is set within the non-projection time period to have 9 to 10 milliseconds, starting after a delay of 2.5 to 3.5 milliseconds from the end of the projection time period.

According to another aspect of the present invention, a method for recording a video using a projector includes the following steps: (a) setting a time schedule for the projection frame cycle of the projector for filming the video, wherein the time schedule includes a projection time period when a projection is cast and a non-projection time period when the projection is not cast, wherein the non-projection time period follows the projection time period in each projection time frame cycle; (b) setting a exposure frame cycle of a camera for recording the video by filming the screen board such that an exposure frame time is set within and is shorter than the non-projection time of the projector; (c) aligning and matching the projection frame cycle of the projector and the exposure frame cycle of the camera; and (d) filming the video using the device equipped with the projector.

Additionally, the non-projection time period is configured to be set within the range of 40% to 60% of the projection frame cycle.

Additionally, the method further includes the step (e) after the step (d), wherein the step (e) includes adjusting the ratio of the projection time period and the non-projection time period of the projection frame cycle to make the projected image appear in the captured video.

Additionally, the step (e) allows users to set the non-projection time period within the range of 0% to 35% of the projection frame cycle depending on a user selection during a certain period of time.

Advantageous Effects of the Invention

According to an embodiment of the present invention, the device and method for recording a video using a projector are provided to temporarily prevent the projected image from appearing in the camera-captured video, while still allowing the user to continuously perceive the projected image. This is particularly useful for recording videos for purposes such as explanatory programs or lectures, where projected images are involved.

According to an embodiment of the present invention, the device and method for recording videos using a projector enable the projected image to be temporarily hidden or displayed in the camera-captured video, while the user perceives the projected image as continuously visible. The present invention is especially useful in recording videos for purposes like explanatory programs or lectures.

According to one embodiment of the present invention, in the video captured by the camera, the projected image is not displayed; only the user's explanation and the outline of the projected image he draws are shown. This presentation can give the impression that the user has considerable artistic skills, thereby enhancing the viewer's engagement and favorability towards the video.

DETAILED DESCRIPTION OF EMBODIMENTS OF THE INVENTION

Figure 1:
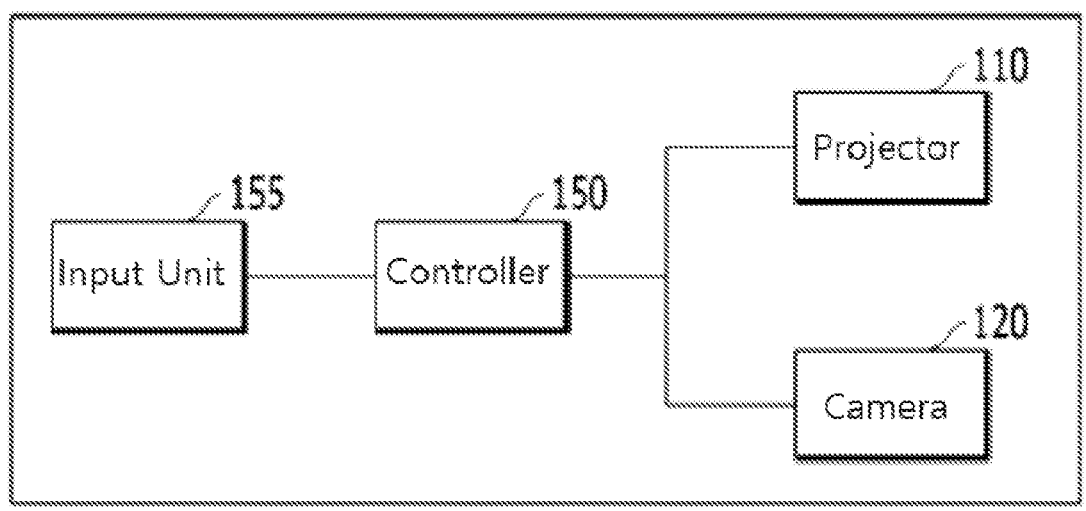
FIG. 1 illustrates a block diagram of a device for recording a video using a projector according to an embodiment of the present invention.

The terminology used in this application is for the purpose of describing specific embodiments and is not intended to limit the invention. Singular expressions include the plural unless the context clearly dictates otherwise.

In this application, when a part "includes" a certain component, this means that it may further include other components rather than excluding other components, unless specifically stated to the contrary.

Additionally, when describing the components of embodiments of the present invention, terms such as first and second may be used. These terms are only used to distinguish the component from other components, and the nature, order, or order of the component is not limited by the term. When a component is described as being 'connected', 'coupled' or 'connected' to other component, that the component may be directly connected, coupled or connected to that other component, but it should be understood that another component may be 'connected', 'combined', or 'connected' between the component and that other component.

According to an embodiment of the present invention, a method is provided to a teacher or video producer for recording a video using a projector, where the digital information is projected onto a screen board by the projector for video production, but the projected image is not temporarily captured in the actual video being produced.

When people look at an object, they may perceive an afterimage, even when the signal is no longer present. Additionally, the image on the screen may still be visually perceived even if it is discontinued to be displayed on the screen. The duration for perceiving these afterimages is quite brief, around $1/16$ of a second.

Therefore, even if the projector image intermittently pauses for intervals less than $1/16$ of a second, users continue to perceive it as a continuously projected image without any discomfort, especially in activities like video production or lectures.

In an embodiment of the present invention, taking into account the time taken to perceive afterimages, when creating videos for purposes such as explanation programs or lectures using projected images, the present invention aims to make the projected images continuously recognizable to the user, while preventing them from appearing in the video captured by the camera. To achieve this, it features including a non-projection frame time, during which the image is not projected, at regular intervals within the projection frame cycle of the projected images. Additionally, the camera's shooting timing is controlled so that the filming occurs within this non-projection frame time.

For example, if a user wishes to create a video featuring a projector image of a world map for an educational program or lecture, he can trace the outline of the world map on a screen board panel as it is projected. In this scenario, while the projected image may not appear in the camera-captured video, only the user's explanation and the outline of the world map he has drawn will be displayed.

Alternatively, when a user creates a video for purposes like an art class explanation program or lecture, using a well-drawn picture projected onto a screen board, he can trace and draw the necessary images with a marker on the board. In this scenario, while the projected picture may not be visible in the camera-captured video, only the user's explanation and the outlines he has drawn will be shown. This can lead viewers to perceive the user as having significant artistic skills, potentially increasing the video's viewership rating.

FIG. 1 illustrates a block diagram of the device for recording a video using a projector according to an embodiment of the present invention.

According to an embodiment of the present invention, the device (100) for recording a video using a projector includes a projector (110) that receives the image for a projection from an external device or internal memory and projects the image onto a screen board, a camera (120) for recording the video by capturing the screen board on which the image is projected, and a controller (150) that controls the projection frame cycle of the projector (110) and an exposure frame cycle of the camera (120).

According to an embodiment of the present invention, the device (100) for recording a video using a projector can be constructed into an integrated device with a single housing that houses all of the projector (110), the camera (200), and the controller (500).

Figure 2:
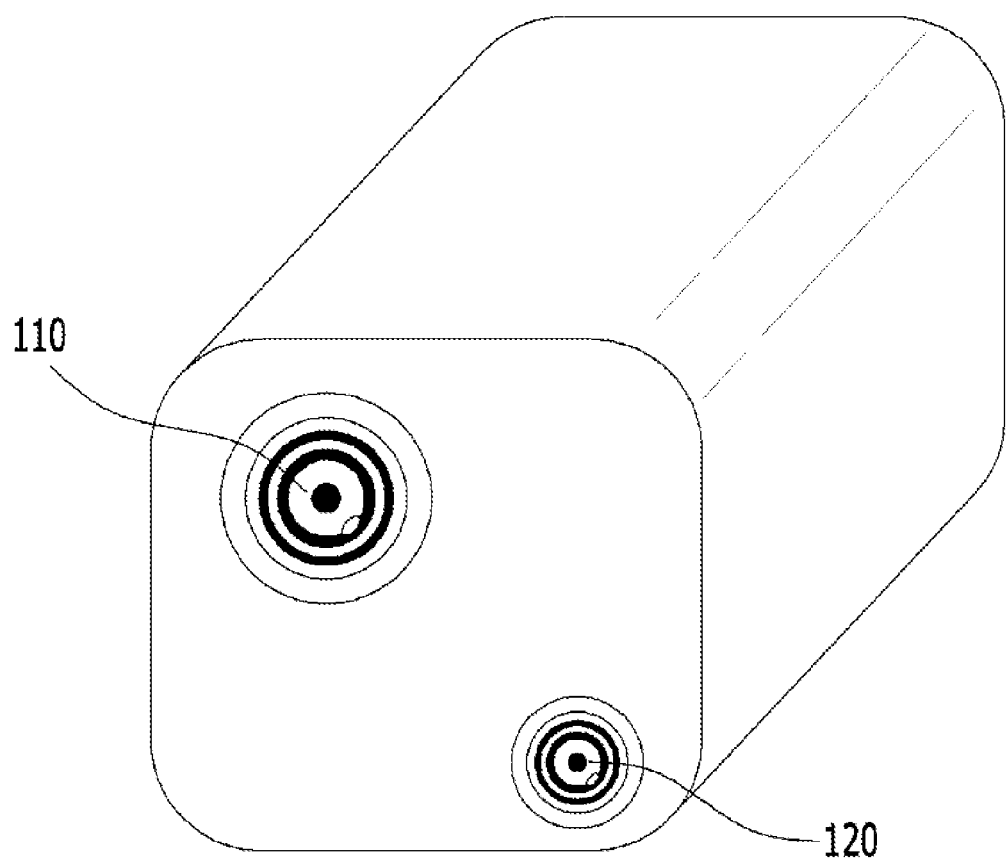
FIG. 2 shows a device for recording a video using a projector according to an embodiment of the present invention, which is constructed into a single integrated device.

FIG. 2 shows a device (100) for recording a video using a projector according to an embodiment of the present invention, which is constructed into a single integrated device.

Alternatively, the projector (110), camera (120), and controller (150) can be separate devices. In this case, the controller (150) can include a personal computer (PC).

According to an embodiment of the present invention, the device (100) or controller (150) may further include an input unit (155) that allows users to selectively input a time schedule condition for the projection frame cycle of the projector (110) and the exposure frame cycle of the camera (120).

Figure 3:
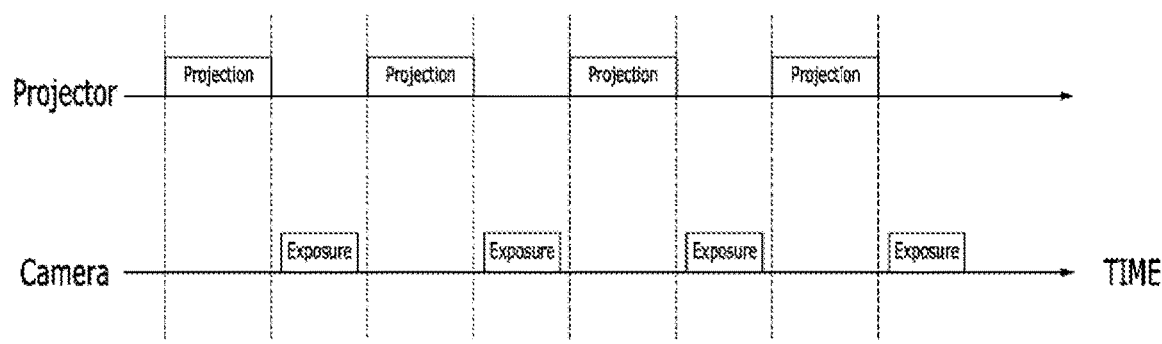
FIG. 3 shows a time chart of the projector and the camera for recording a video using a projector according to an embodiment of the present invention.

FIG. 3 shows a time chart of the projector and the camera for recording a video using a projector according to an embodiment of the present invention.

FIG. 3 shows the projection cycle of the projector (110) at the top and the exposure cycle of the camera (120) at the bottom.

Referring to FIG. 3, the controller (150) controls the time schedule for the projection frame cycle of the projector (110), which includes a projection time period when the projection is cast on the screen board and a non-projection time period when the projection is not cast, for each projection frame cycle. According to an embodiment of the present invention, the non-projection time period is controlled by the controller within the range of 40% to 60% of the projection frame cycle. Additionally, the exposure frame cycle of the camera (120) for capturing the screen board is controlled such that the exposure frame time is set within and is shorter than the non-projection time of the projector (110).

According to an embodiment of the present invention, the projection frame cycle of the projector (110) is set to have a consistent period within the range of 20 to 50 milliseconds in order to utilize the afterimage effect.

According to an embodiment of the present invention, the method for recording a video of the device for recording a video using a projector is as follows.

First, the step (a) includes setting a time schedule for the projection frame cycle of the projector required for filming the video.

In the step (a), the projection frame cycle of the projector is set in the range of 20 to 50 milliseconds, and each projection frame cycle includes a projection time period when the projection is cast on the screen board and a non-projection time period when the projection is not cast on the screen board, where the non-projection time period follows the projection time period. Here, the non-projection time period is set in the range of 40 to 60% of the projection frame period.

Next, the step (b) includes setting an exposure frame cycle of a camera for filming the video by filming the screen board such that an exposure frame time is set within and is shorter than the non-projection time of the projector (110).

Next, the step (c) includes setting the projector (110) and the camera (120) to the screen board, and aligning and matching the projection frame cycle of the projector (110) and the exposure frame cycle of the camera (120).

If the projection cycle of the projector (110) and the exposure cycle frame of the camera (120) do not match, a projector image pattern may be recorded to the camera (120). In the step (c), a process is performed to precisely adjust the period during which the projector emits pattern light and the period during which the camera captures the image.

On the other hand, if the time required to capture a video from the camera changes, such as when the resolution of the captured video is altered or the exposure time varies, the synchronization between the camera and the projector may become incorrect. Therefore, this process should be performed whenever necessary or when the camera's exposure environment changes due to surrounding conditions.

After the synchronization step, the filming step (d) to film a video using the device equipped with the projector is performed.

According to another embodiment of the present invention, during the filming step (d), if necessary according to the user's selection, the step (e) may further be performed to adjust the ratio of the projection time period and the non-projection time period of the projection frame cycle to make a projected image appear in the video through the input unit (155).

According to an embodiment of the present invention, when the non-projection time period is reduced to less than 35% of the projection frame cycle, the projected image begins to appear in the captured video.

In a preferred embodiment of the present invention, in the step (e), if necessary, the non-projection time period may be controlled in a range of 0 to 35% of the projection frame cycle during certain sections of the video depending to the user's selection.

The step (e) can be performed when it is more effective to insert a projected image into a certain part of the video depending on the purpose of video production.

Figure 4:
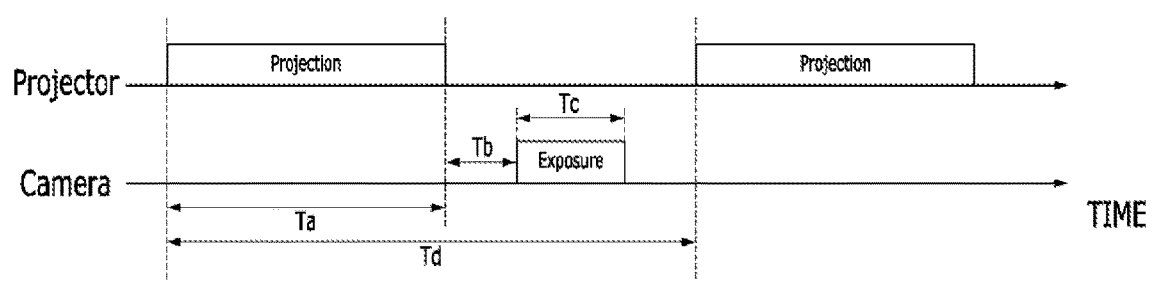
FIG. 4 shows a time chart of the projector and the camera for recording a video using a projector according to a preferred embodiment of the present invention.

FIG. 4 shows a time chart of the projector and the camera for video recording using the projector according to a preferred embodiment of the present invention.

FIG. 4 presents a diagram illustrating the preferred timing of operations for the projector and camera in a device designed for recording video using a projector. This is based on an embodiment of the present invention and results from various experiments with moving subjects in the production of YouTube content, real-time lecture videos, and other video recordings.

Referring to FIG. 4, the controller (150) establishes the preferred projection frame cycle (Td) of the projector (110) and the exposure frame cycle of the camera capturing the screen board within a range of 30 to 35 milliseconds, alternating continuously. The projector's (110) projection time period (Ta) is set between 15 to 18 milliseconds for each projection frame cycle, followed by a non-projection time period also ranging from 15 to 18 milliseconds. Additionally, within the camera's exposure frame cycle, the exposure frame time is scheduled during the non-projection period. However, this begins after a delay time (Tb) of 2.5 to 3.5 milliseconds after the end of a projection time.

The preferred exposure frame (exposure) time (Tc) of the present invention is set at 9 to 10 milliseconds.

Figure 5:
FIG. 5 shows an image showing the projected image projected by a projector which is visible to a user according to an embodiment of the present invention.
Figure 6:
FIG. 6 shows a video captured by the method for recording a video using a projector according to an embodiment of the present invention.

FIGS. 5 and 6 show an example of drawing a picture of a person using the device for recording a video using a projector according to an embodiment of the present invention.

FIG. 5 shows an image projected to a user by the projector according to an embodiment of the present invention.

FIG. 6 presents the captured video using the video recording method with a projector, as described in an embodiment of the present invention. This figure shows a user drawing the image of a person on a screen board, following the projected image from the projector depicted in FIG. 5. In the captured video, the outline of the person drawn by the user is visible, while the projected image from the projector is not.

Figure 7:
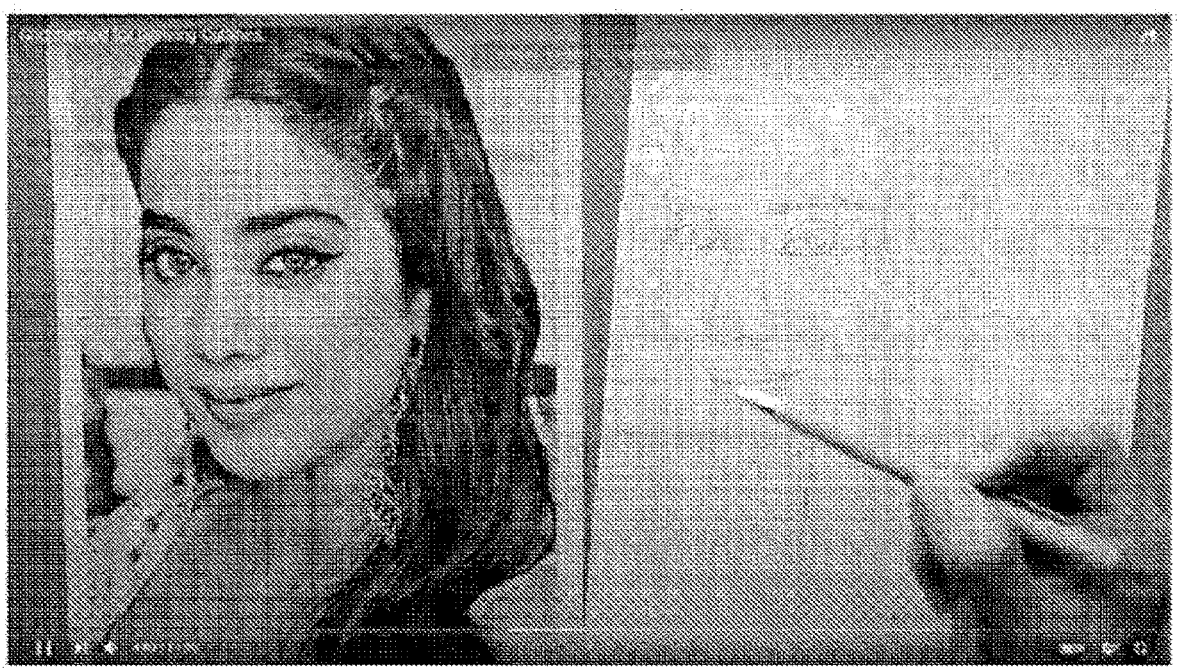
FIGS. 7 to 9 show an example of providing a picture guide grid projected onto a screen so that a user can draw using the projected picture guide grid according to an embodiment of the present invention.
Figure 8:
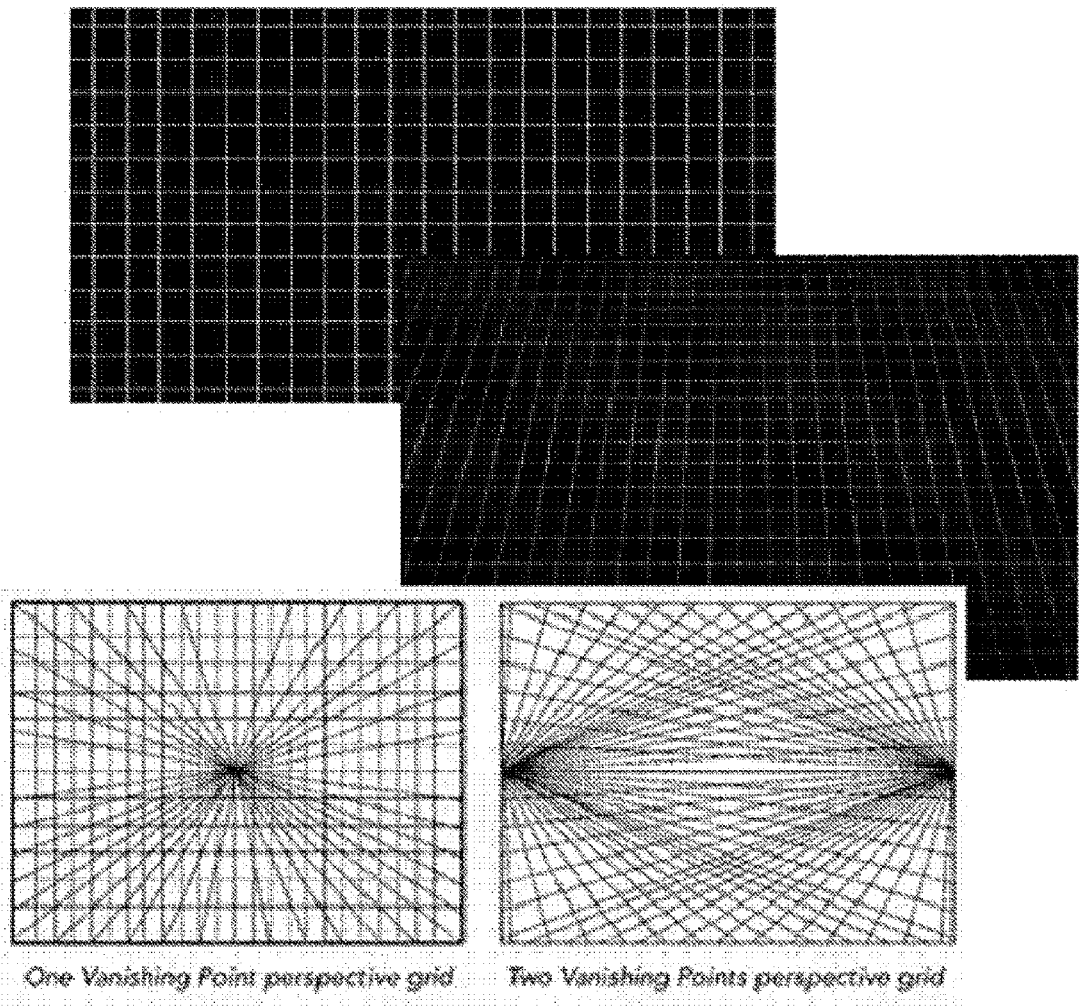
Figure 9:
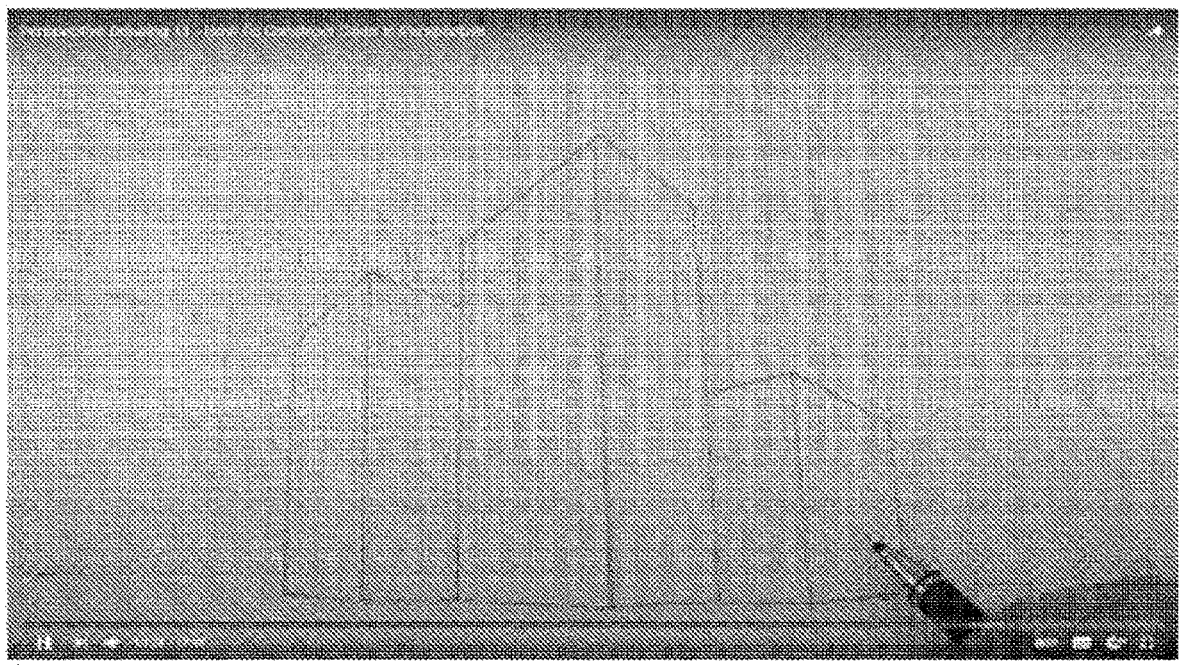

FIGS. 7 to 9 show an example of providing a picture guide grid projected onto a screen so that a user can draw using the projected picture guide grid according to an embodiment of the present invention.

FIG. 7 is an example of providing a portrait grid and the user drawing a person. In the actual captured video, only the drawn person appears and the grid does not appear.

FIG. 8 shows a grid projected from a projector, and FIG. 9 shows an example of the user drawing a building sketch using the grid for perspective projection.

Referring to FIG. 9, the video captured of the actual screen board has the effect of ensuring that only the drawn building outline appears and the grid does not appear.

What is claimed is:

1. A device for filming a video using a projector, comprising:
   the projector that receives an image for a projection from an external device or internal memory and projects the image onto a screen board;
   a camera for recording the video by filming the screen board; and
   a controller that controls a projection frame cycle of the projector and an exposure frame cycle of the camera,
   wherein the controller controls a time schedule for the projection frame cycle of the projector for filming the video to include a projection time period when the projection is cast, and a non-projection time period when the projection is not cast,
   wherein the non-projection time period follows the projection time period in each projection time frame cycle,
   wherein the non-projection time period is controlled within the range of 40% to 60% of the projection frame cycle, and
   wherein the exposure frame cycle of the camera is controlled such that an exposure frame time is set within and is shorter than the non-projection time of the projector.

2. The device of claim 1, wherein the controller includes an input unit that allows a user to selectively input a time schedule condition for the projection frame cycle of the projector and the exposure frame cycle of the camera.

3. The device of claim 1, wherein the controller is configured to set the projection frame cycle of the projector to have a consistent period within the range of 20 to 50 milliseconds.

4. The device of claim 3, wherein the controller is configured to set the projection frame cycle of the projector in the range of 30 to 35 milliseconds and the non-projection time period in the range of 15 to 18 milliseconds.

5. The device of claim 4, wherein the exposure frame time of the camera is set within the non-projection time period to have 9 to milliseconds, starting after a delay of 2.5 to 3.5 milliseconds from an end of the projection time period.

6. The device of claim 1, wherein the camera and the projector are integrated into a single housing.

7. A method for filming a video using a projector, comprising the steps of:
   (a) setting a time schedule for a projection frame cycle of the projector for filming the video, wherein the time schedule includes a projection time period when a projection is cast and a non-projection time period when the projection is not cast, wherein the non-projection time period follows the projection time period in each projection time frame cycle;
   (b) setting an exposure frame cycle of a camera for filming the video by filming a screen board such that an exposure frame time is set within and is shorter than the non-projection time of the projector;
   (c) aligning and matching the projection frame cycle of the projector and the exposure frame cycle of the camera; and
   A (d) filming the video using a device equipped with the projector.

8. The method of claim 7, wherein the non-projection time period is configured to be set within the range of 40% to 60% of the projection frame cycle.

9. The method of claim 7, further including the step (e) after the step (d), wherein the step (e) includes adjusting the ratio of the projection time period and the non-projection time period of the projection frame cycle to make a projected image appear in the video.

10. The method of claim 9, wherein the step (e) allows a user to set the non-projection time period within the range of 0% to 35% of the projection frame cycle depending on a user selection during a certain period of time.

* * * * *